No. 626,411.  
D. R. C. DEVINE.  
WHEEL FOR BICYCLES.  
(Application filed May 25, 1898.)  
Patented June 6, 1899.

(No Model.)

WITNESSES:  
P. F. Eagle  
L. Donville

INVENTOR  
David R. C. Devine.  
BY  
Wiedersheim & Fairbanks  
ATTORNEYS.

THE NORRIS PETERS CO., PHOTO-LITHO., WASHINGTON, D. C.

UNITED STATES PATENT OFFICE.

DAVID R. C. DEVINE, OF PHILADELPHIA, PENNSYLVANIA, ASSIGNOR OF ONE-HALF TO ISAAC F. HOFFNER, OF SAME PLACE.

WHEEL FOR BICYCLES.

SPECIFICATION forming part of Letters Patent No. 626,411, dated June 6, 1899.

Application filed May 25, 1898. Serial No. 681,726. (No model.)

*To all whom it may concern:*

Be it known that I, DAVID R. C. DEVINE, a citizen of the United States, residing in the city and county of Philadelphia, State of Pennsylvania, have invented a new and useful Improvement in Wheels for Bicycles, &c., which improvement is fully set forth in the following specification and accompanying drawings.

My invention consists of an improved construction of wheel especially adapted for bicycles and other vehicles, in which provision is made for attaining the desired cushioning or resiliency thereof without necessitating the use of pneumatic tires or similar devices.

It further consists of novel details of construction, all as will be hereinafter fully set forth, and particularly pointed out in the claim.

Figure 1:
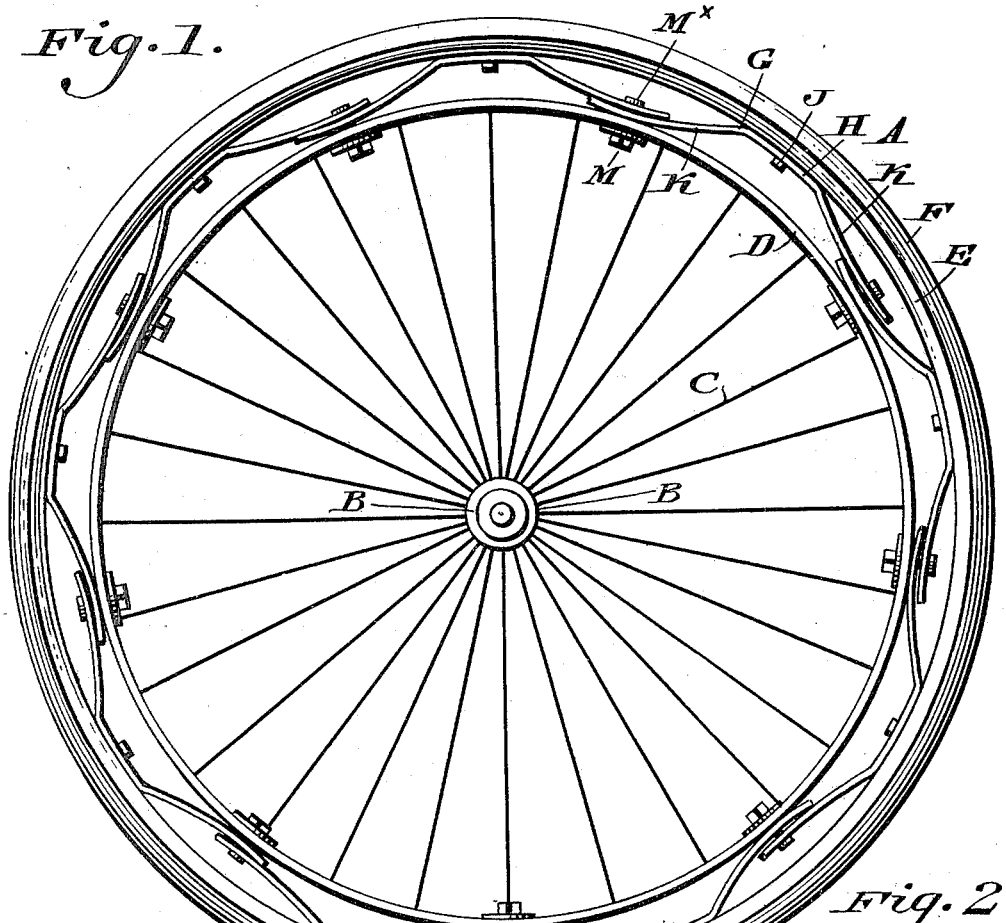
Figure 2:
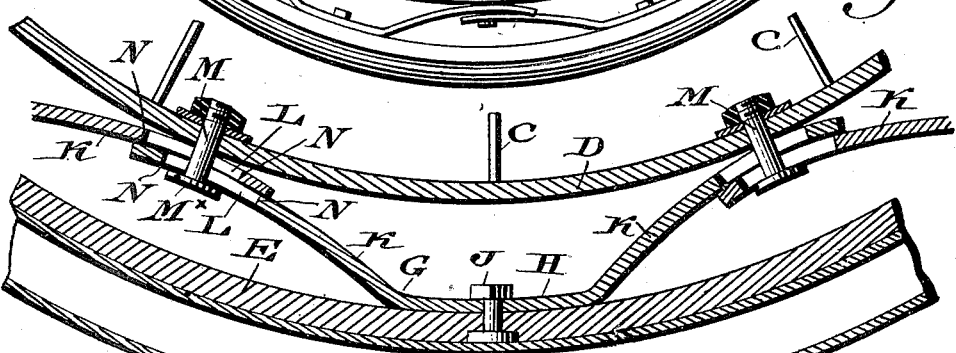

Figure 1 represents a side elevation of a wheel for bicycles and other vehicles embodying my invention. Fig. 2 represents, on an enlarged scale, a vertical sectional view showing the springs and their adjuncts whereby the desired resiliency is obtained.

Similar letters of reference indicate corresponding parts in the figures.

Referring to the drawings, A designates a bicycle-wheel, the same consisting of a hub B, which has the spokes C radiating therefrom, the outer extremities of said spokes being secured in any suitable manner to the inner ring D, which may be of metal or other suitable material.

E designates an outer concentric ring, which may be of wood or other suitable material, is provided with the tire F, and has attached to the inner periphery thereof the spring G, the same consisting of the flattened portion H, which is secured to the inner periphery of said outer ring by means of a bolt or screw J or other similar fastening device. The free ends or resilient members K of the spring G are deflected from the body portion H in the direction of the inner ring D, said free ends having the slots L therein, through which pass the bolts or other fastening devices M, the latter passing also through the ring D and being provided with heads $M^\times$, which prevent displacement of said members K, it being further noted that the free ends of each pair of adjacent members K of each spring slide upon each other and that their extent of motion is limited by the termini N of the slots L, as is evident.

The operation is as follows: When the wheel is applied to a bicycle or other vehicle, the hub B has a suitable bearing in the frame or running-gear thereof, and it will be evident that the weight of said frame or running-gear will cause the ring D to vibrate with relation to the outer ring E during the rotation and progression of the wheel, said vibration of the inner ring with respect to the outer ring being permitted by means of the slots in the resilient members K, which have the connection M common thereto and to the ring D, while the termini N of said slots act as stops or abutments, and thus prevent any undue vibration of the inner ring with respect to the outer ring E and the members K.

It will be evident that I may employ, if desired, a solid tire, or I may use a hollow pneumatic tire F, as may be desired, according to requirements.

Having thus described my invention, what I claim as new, and desire to secure by Letters Patent, is—

A wheel having inner and outer rings, springs rigidly secured at their crowns to one of said rings and having slots near their ends, the ends of two adjacent springs overlapping, and headed bolts passed through said slots into the other ring, said bolts permitting said slotted ends to slide on each other and their heads preventing said ends from springing toward the opposite ring.

DAVID R. C. DEVINE.

Witnesses:
WM. C. WIEDERSHEIM,
I. F. HOFFNER.